July 9, 1935. W. G. JOHNSON 2,007,447
CASTERING DOLLY
Filed Jan. 17, 1933
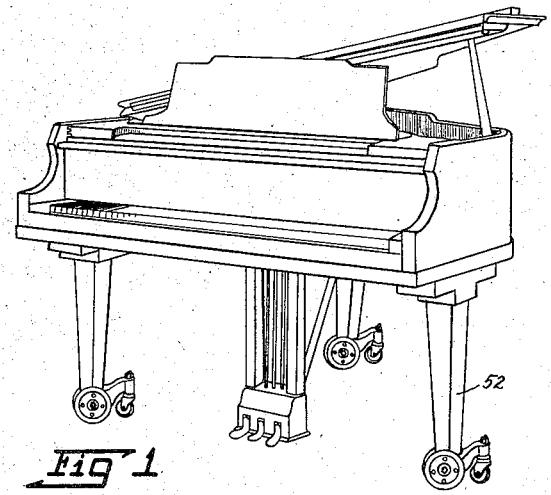
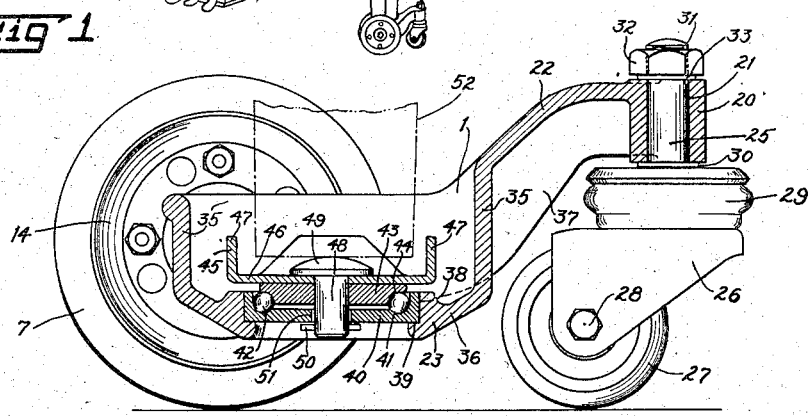
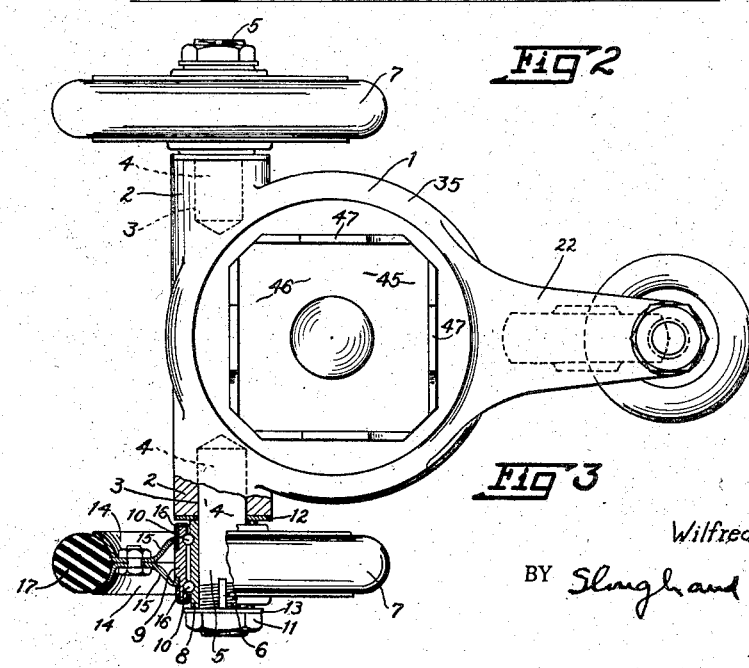
INVENTOR.
Wilfred G Johnson
BY Slingh and Canfield
ATTORNEY.

Patented July 9, 1935

2,007,447

UNITED STATES PATENT OFFICE 2,007,447

CASTERING DOLLY

Wilfred G. Johnson, Elyria, Ohio, assignor to The Colson Company, Elyria, Ohio, an organization of Ohio Application January 17, 1933, Serial No. 652,180

8 Claims. (Cl. 280—61)

This invention relates to trucks and particularly to small trucks which are commonly known as dollies.

Trucks or dollies as heretofore proposed are constructed to support upon the wheels of a single dolly the entire load to be moved by the dolly. In some instances, however, it is impractical or inconvenient to place on a single dolly or truck the load to be carried. Illustrative of such loads are pianos. Again, even if the load can be placed upon a single dolly, such a dolly to support the entire load must be large and cumbersome where the load is heavy.

It is therefore an object of this invention to provide a truck or dolly adapted by its construction to support a part only of a load to be transported, the rest of the load being supported by another dolly or other dollies of like or similar construction.

Another object of my invention is to provide such a dolly particularly adaptable to support the load upon one leg of a piano or like leg-supported load.

Another object is to provide a truck or dolly of the class referred to of the castering type.

Another object is to provide a small truck or dolly of the castering type but constructed to support the major part of a load upon non-castering wheels.

Another object is to provide an improved small truck or dolly of the three-wheel variety.

Another object is to provide a small truck or dolly of the three-wheel variety, one only of which wheels is castering.

Another object is to provide a small truck or dolly having a plurality of wheels and having improved load-supporting means to distribute the load upon the several wheels.

Another object of my invention is to provide a castering small truck or dolly adapted to be used in a plurality of like trucks or dollies to support several portions of a load to be transported, for example the legs of a piano and each dolly provided with improved means whereby it may move with a castering movement relative to the load being carried and independently of the castering movements of the several dollies.

Other objects of my invention will be apparent to those skilled in the art to which my invention appertains.

My invention is fully disclosed in the following description taken in connection with the accompanying drawing, in which:—

Fig. 1 is an elevational view of a piano supported upon dollies embodying my invention, each leg of the piano resting upon a separate dolly;

Fig. 2 is a view to an enlarged scale illustrating one of the dollies of Fig. 1 and with parts shown in section for clearness;

Fig. 3 is a top plan view of the dolly of Fig. 2.

Referring to the drawing, I have shown at 1 a main truck or dolly frame which, in the preferred embodiment of my invention, is made from a casting.

The frame 1 has projecting laterally and oppositely from a forward portion thereof a pair of bosses 2—2 provided with outwardly open opposite bores 3—3 into which are press-fitted studs 4—4, having wheel supporting portions 5—5 projecting out of the bores, and threaded at their outer ends as at 6.

Wheels 7—7 are mounted on the studs 4 according to the following construction. An inner race element 8 is telescoped within an outer race element 9, and bearing balls 10—10 are disposed in annular confronting raceways in the race elements 8 and 9.

The inner race element 8 projects outwardly from the outer race element 9 and is telescoped over the studs 4 and rigidly secured thereon by a nut 11 on the threads 6 clamping the race element 8 by its ends between the nut and the end of the boss 2.

If desired, washers 12 and 13 may be interposed at the inner and outer ends of the race element 8.

The wheel proper comprises a pair of side plates 14—14 dished outwardly axially as at 15 and telescoped over the outer race element 9. Hub caps 16 are provided having inwardly directed flanges, one flange entering the space between the inner race elements 8 and 9 and the other telescoped over the outer end portions of the race element 9. Rubber tires 17 are carried in the outer peripheral portions of the guide plates 14—14.

The bearing construction here above described constitutes no essential part of my invention. Such a bearing construction is more completely described in the application of Wilfred G. Johnson, filed September 16, 1929, Serial No. 393,075, and reference may be had thereto if desired.

In the truck or dolly under consideration, load upon the frame 1 is transmitted through the studs 4, and through the anti-friction bearing above described through the tires 17 supported upon the floor.

Spaced longitudinally from the wheels 7—7, the frame 1 is provided with a socket portion 20 having a substantially vertical bore 21 therethrough. The socket portion 20 is disposed relatively higher than the axis of the wheels 7—7 and is connected to the portions of the frame supporting the studs 4 by an upwardly inclined neck 22 joined at its upper end to the socket portion 20 and at its lower end to an intermediate load-supporting portion 23 of the frame 1.

In the bore 21 of the socket portion 20, the stem 25 of a castering wheel construction is supported. The caster wheel construction comprises a fork 26, a wheel 27 resting on the floor and rotatably mounted therein on a shaft 28; and comprises a castering bearing preferably of the ball type enclosed in a housing 29, one part of the bearing being connected to the fork 26 and the other part to the stem 25. A shoulder 30 on the stem 25 or on a portion of the castering bearing connected thereto engages the lower side of the socket 20, and by means of threads 31 and a nut 32 on the upper end of the stem 25, the stem may be rigidly mounted in the bore 21 by screwing the nut 32 on the threads to clamp the socket portion 20 between the shoulder 30 and the nut 32. If desired, a washer 33 may be interposed under the nut 32.

The castering construction is not described in detail inasmuch as such constructions are well known and any castering wheel construction having a wheel 27 and a stem 25 may be employed.

The intermediate load supporting portion 23 of the frame 1 is in general of cup-form having side walls 35 and a bottom wall 36 and is thus given the maximum of strength for the minimum of material to support a load on the cup bottom; and the side walls of the cup may be provided with extensions 37 extending therefrom to the socket portion 20 in the nature of a rib or ribs to strengthen the neck 22. Thus the frame is rendered throughout of the maximum strength with the minimum of material.

The cup bottom 36 is provided with an annular bore 38 and shoulder 39 in which is seated a generally cup form ball bearing race element 40 having a generally horizontally disposed receway 41 in which a circular series of balls 42 is disposed. An upper race element 43 generally of the well known cone form has at its periphery a raceway 44 cooperating with the raceway 41 and the balls 42.

A receptacle 45, preferably formed from heavy sheet metal, rests upon the race element 43. The receptacle 45 has a flat bottom portion 46 and upstanding ears 47—47 laterally thereof. Centrally the receptacle 45, race element 43 and race element 40 are perforated, and a pin 48 having a relatively large upwardly rounded head 49 is projected through the perforation, and below the race element 40 a transverse pin such as a cotter pin 50 is projected therethrough through a suitable hole drilled therein.

By the construction just described, the receptacle 45 or the receptacle and the pin 48 may rotate with the race element 43 upon the ball 42. Preferably, clearance as at 51 is provided in the perforation in the race element 40 for the pin 48.

In operation, when the dolly is used to support, for example the leg of a piano as illustrated, the piano leg 52 is lifted and placed by its lower extreme end in the receptacle 40 or upon the rounded head 49 of the pin 48. The other legs of the piano are similarly supported on other similar or like dollies.

When the piano is now pushed to propel it along the floor, the movement thereof is transmitted through the receptacle 45 or pin 48 and the bearing comprising the race elements 40 and 43 and ball 44 to the dolly frame and thence to the wheels as above described.

The greater portion of the load is carried by the wheels 7—7, the axis of the ball bearing or of the pin 48 being disposed nearer the axis of the wheels 7 than the socket portion 20. While propelling the piano as described, the caster wheel 27 may caster around the axis of the stem 25, the independent rotational mounting of the wheels 7—7 permitting such movement. Furthermore, as the caster moves along over an uneven floor, the three wheels may independently ride over obstructions or irregularities of surface, and where the rounded pin head 49 is employed, the load is maintained substantially at the axis of the ball bearing.

My invention is not limited to any particular construction of bearing for the wheels 7—7 or for the receptacle 45 or castering wheel 27 inasmuch as such bearings may be variously constructed within the scope and spirit of my invention without sacrificing its advantages.

My invention is not otherwise limited to the exact details of construction shown and described but may be embodied, within the scope of the appended claims, in various forms which will occur to those skilled in this art.

I claim:—

1. In a castering truck, a body, a pair of spaced body supporting main non-castering wheels, each rotatable on a transverse axis, a castering wheel supporting said body and rotatable on a vertical axis spaced from said transverse axis, a load support on the body more remote from the castering wheel axis than from the said transverse axes, a rotational bearing on the body for the load support having a vertical axis of rotation, the load support comprising a load engageable portion of restricted area projecting upwardly therefrom and disposed generally coaxial of the rotational bearing, and an elevated load retaining rim portion surrounding the restricted area portion.

2. In a castering truck, a body, a pair of spaced body supporting main non-castering wheels, each rotatable on a transverse axis, a castering wheel supporting said body and rotatable on a vertical axis spaced from said transverse axis, a load support on the body more remote from the castering wheel axis than from the said transverse axes, a rotational bearing on the body for the load support having a vertical axis of rotation, the bearing comprising a stationary raceway for a horizontal circular series of balls, and a movable raceway associated therewith and supported on the balls, and the load support comprising a generally cup-form element, upwardly open, supported on the upper raceway, and an axially disposed pin element extending through the bottom of the cup-form element and through the two raceways, and a load engageable head on the pin element projecting above the bottom of the cup-form element.

3. In a truck adapted to be used in multiple for supporting a weight having legs, a truck body, a pair of spaced body supporting main wheels, rotatable each on a transverse axis, a castering wheel supporting said body and rotatable on a generally vertical castering axis spaced from the transverse axis, a load support on the body more remote from the castering wheel axis than from the transverse wheel axes, a rotational bearing on the body for the load support having a vertical axis of rotation, the load support having a portion of restricted area extending upwardly therefrom generally coaxial of the rotational bearing upon which the end of a leg may rest and relatively rock universally to substantially equalize the load on the rotational bearing upon the encountering of ground inequalities by the three wheels and guide means to position the leg on the portion of restricted area.

4. In a castering truck for supporting heavy legged furniture and the like, a unitary main body formed from cast metal comprising a cup-form portion into which a leg may be projected, and having a pair of stub axles projecting oppositely laterally therefrom and secured thereto for carrying supporting main wheels, and comprising an upwardly outwardly inclined integral neck having at its outer end a castering bearing for a castering supporting wheel, a load supporting element mounted on a rotational bearing supported on the cup bottom and having a vertical axis of rotation, the load supporting element comprising an upwardly projecting portion of restricted area upon which the leg end may rest and to permit universal relative rocking movement of the leg end and the main body.

5. In a castering truck, a body, a pair of spaced body supporting main non-castering wheels, each rotatable on a transverse axis, a castering wheel supporting said body and rotatable on a vertical axis spaced from the transverse axis, a load support on the body, a rotational bearing on the body for the load support having a vertical axis of rotation, the load support comprising a load engageable portion of restricted area projecting upwardly therefrom and positioning means to position the load on the upwardly projecting portion.

6. In a castering truck, a body, a pair of spaced body supporting main non-castering wheels, each rotatable on a transverse axis, a castering wheel supporting said body and rotatable on a vertical axis spaced from the transverse axis, a load support on the body, a rotational bearing on the body for the load support having a vertical axis of rotation, the bearing comprising a stationary raceway for a horizontal circular series of balls, and a movable raceway associated therewith and supported on the balls, and the load support comprising a generally cup-form element, upwardly open, supported on the upper raceway, and a load engageable head projecting above the bottom of the cup-form element.

7. In a truck adapted to be used in multiple for supporting a weight having legs, a truck body, a pair of spaced body supporting main wheels, rotatable each on a transverse axis, a castering wheel supporting said body and rotatable on a generally vertical castering axis spaced from the transverse axis, a load support on the body, a rotational bearing on the body for the load support having a vertical axis of rotation, the load support having a portion of restricted area extending upwardly therefrom generally coaxial of the rotational bearing upon which the end of a leg may rest and rock relatively universally to substantially equalize the load on the rotational bearing upon the encountering of ground inequalities by the three wheels, and guide means to position the leg on the portion of restricted area.

8. In a castering truck for supporting heavy legged furniture and the like, a unitary main body formed from cast metal comprising a cup-form portion into which the leg may be projected, and having a pair of stub axles projecting opposite laterally therefrom and secured thereto for carrying supporting main wheels, and comprising an upwardly outwardly inclined integral neck having at its outer end a castering bearing for a castering supporting wheel, a load supporting element mounted on a rotational bearing supported on the cup bottom and having a vertical axis of rotation, the load supporting element comprising an upwardly projecting portion of restricted area upon which the leg end may rest and permit universal relative rocking movement of the leg end and main body, and comprising positioning means to position the leg end on the upwardly projecting portion to maintain it out of contact with the cup wall.

WILFRED G. JOHNSON.